UNITED STATES PATENT OFFICE.

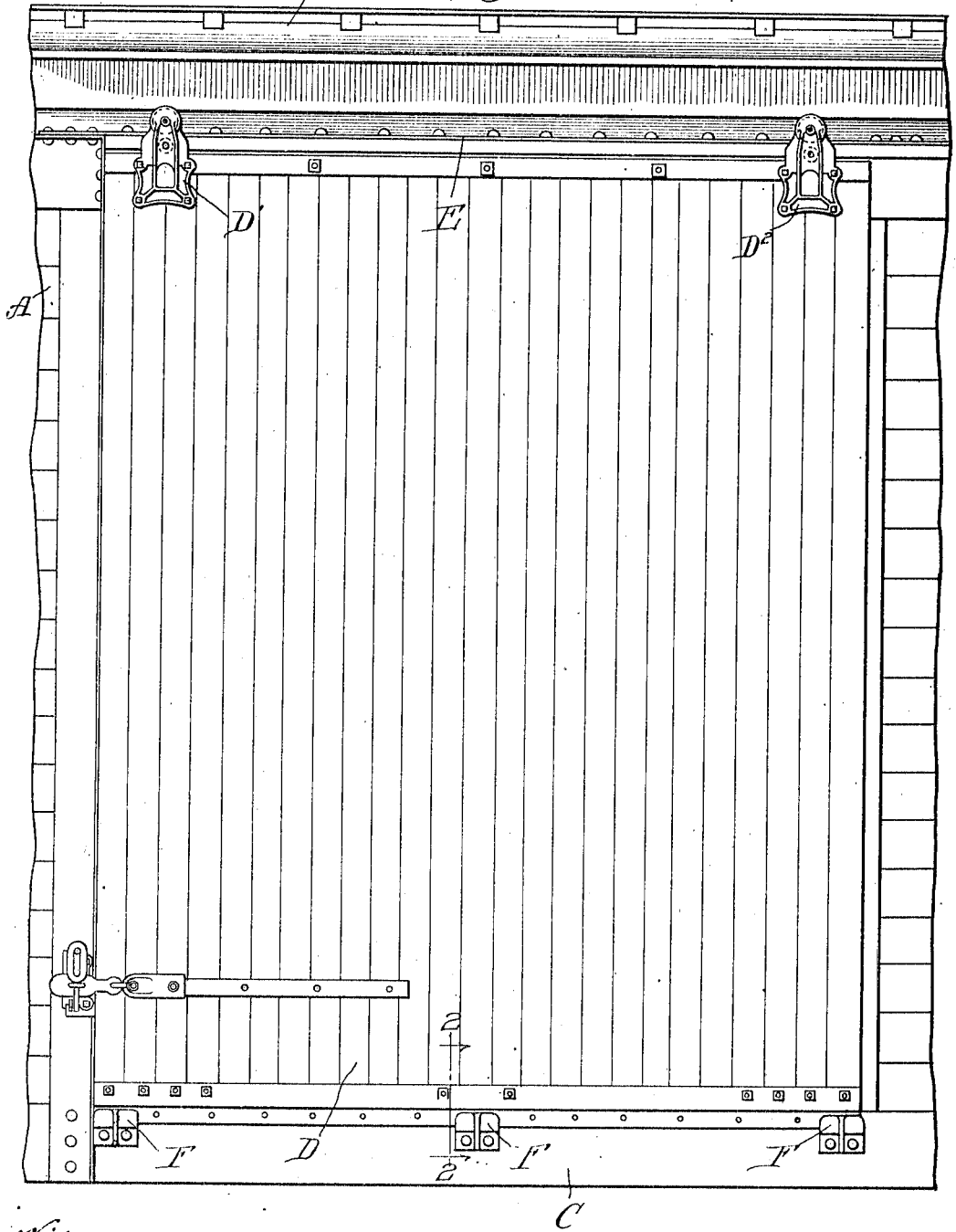

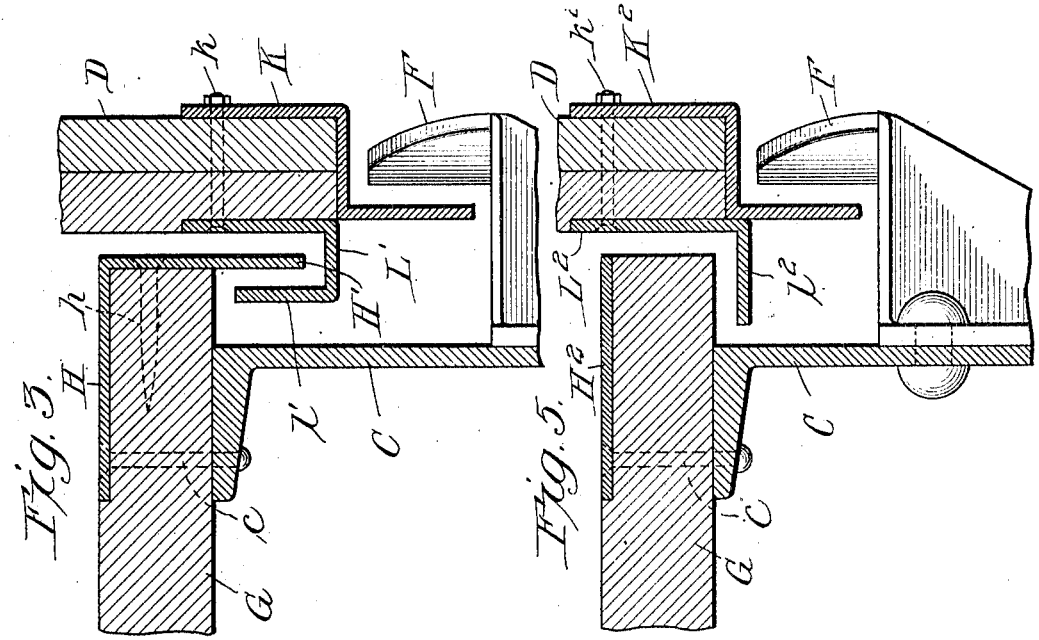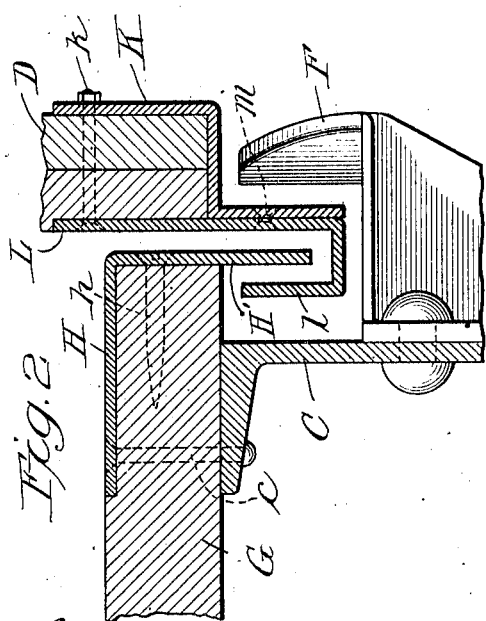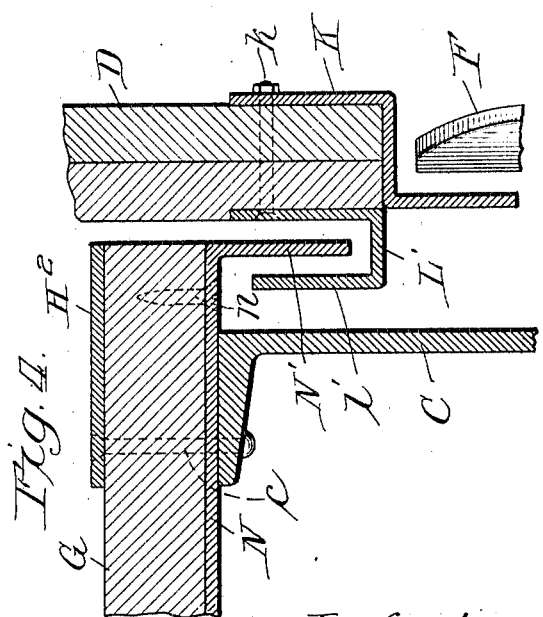

PERCY M. ELLIOTT, OF CHICAGO, ILLINOIS.

FREIGHT-CAR.

1,088,775.

Specification of Letters Patent.

Patented Mar. 3, 1914.

Application filed March 29, 1913. Serial No. 757,658.

*To all whom it may concern:*

Be it known that I, PERCY M. ELLIOTT, a citizen of the United States, residing at Chicago, in the county of Cook and State of Illinois, have invented certain new and useful Improvements in Freight-Cars, of which the following is a specification.

My invention relates in general to freight cars, and more particularly to means for providing a dust and weather-proof joint between the lower edges of the sliding side doors and the bottoms of the door openings.

In order that the contents of freight cars may be protected from dust and other matter, it is desirable that the lower edges of the doors when closed should not only be retained close to the adjacent edges of the bottoms of the door openings, but that horizontal overlapping or interlocked strips should be interposed between the door bottoms and car floor to prevent the ingress of dust and to form a substantially weather-proof joint.

The primary object of my invention is to provide a freight car with overlapping or interlocking strips between the lower edge of the vertical sliding door and the bottom of the door opening, which will not interfere with the free movement of the door into open and closed positions, but which will prevent the ingress of dust to the interior of the car and thereby more fully protect the contents thereof.

A further object of my invention is to provide a dust and weather-proof joint between the lower edge of a sliding car door and the bottom of the door opening, which will be simple in construction, efficient in use, and convenient in application to cars of usual construction.

My invention will be more fully described hereinafter with reference to the accompanying drawings, in which the same is illustrated as embodied in several convenient and practical forms, and in which—

Figure 1 is an elevational view of a portion of the side of a freight car showing the sliding door provided with one form of my invention; Fig. 2, a detail sectional view on line 2—2, Fig. 1; and Figs. 3, 4 and 5, views similar to Fig. 2, showing modified embodiments of my invention.

Similar reference characters are used to designate similar parts in the several figures of the drawings.

Reference letter A indicates the side of a freight car of any usual ordinary construction.

B designates the car roof and C one of the side sills which is preferably in the form of a channel beam having its flanges projecting inwardly, as indicated in Figs. 2 to 5 of the drawings.

D indicates a sliding side door which is provided with hangers D' and $D^2$ adjacent its top for supporting the door through engagement with a track E of any suitable construction.

F designates the usual door guide brackets secured to the side sill C and engaging the lower edge of the door to retain it close to the car side.

G designates the car floor which is supported upon the longitudinal sills and projects beyond the side sills C, as shown in Figs. 2 to 5 of the drawings.

The above features of freight car construction do not in themselves constitute my invention, but are illustrated in order that the construction and operation of my invention may be fully disclosed.

Referring more particularly to Fig. 2, H designates a threshold plate overlying the portion of the floor at the bottom of the door opening and provided with a depending flange H' which projects below the car floor. The threshold plate may be conveniently secured in position by means of bolts, such as $e$, which extend through the horizontal portion thereof and also through the floor and upper flange of the channel side sill C. The depending portion H' of the threshold plate may also be provided with screws, such as $h$, extending into the floor. K designates a Z-beam secured along the bottom of the door D with one of its flanges depending substantially flush with the inner surface of the door. L designates a plate secured to the inner surface of the door adjacent its lower edge and extending downwardly below the plane of the depending flange of the threshold plate, where it is provided with an inwardly and upwardly projecting flange $l$ extending to the rear of the depending flange H' of the threshold plate. The plate L may be conveniently secured to the door by means of bolts $k'$ extending through the same and also through the door and upper flange of the Z-bar K. Rivets m are also provided for securing the lower flange of the Z-bar to the adjacent portion of the plate L. It will be observed that in this form of my invention the lower edge of the door is substantially flush with the under surface of the car floor so that the lower flange of the Z-bar and the interlocked flanges on the lower edge of the plate L and on the threshold plate H, are located within the space between the door brackets F and the top surface of the side sill C.

In the form of my invention shown in Fig. 3, the door D' extends below the car floor, and hence door plate L' lies in a plane above the lower depending flange of the Z-bar K'. In this form of my invention the door plate L' is secured to the door D' by means of bolts k' extending through the same and through the door and also through the upper flange of the Z-bar K'.

The form of my invention shown in Fig. 4 is similar to that shown in Fig. 3, except that the threshold plate H² is not provided with a depending flange to interlock with the flange on the door plate, but a separate plate N is secured beneath the car floor and is provided with a depending flange N' which extends within the channel shaped door plate L.' The plate N' is secured beneath the car floor by means of the bolts c extending through the same and also through the upper flange of the side sill C and car floor, and the threshold plate H².

The form of my invention shown in Fig. 5 is similar to that shown in Fig. 4, except that the door plate I² is provided with an inwardly projecting horizontal flange l² which serves as a weather strip and underlies the portion of the car floor which projects beyond the side sill C.

From the foregoing description of the several forms of my invention which I have herein illustrated and described, it will be observed that my invention enables a dust and weather-proof joint to be formed between the lower edge of a vertical sliding door and the adjacent portion of the car floor which forms the bottom of the door opening, without in any wise interfering with the freedom of the movement of the door into open or closed position, but on the other hand serving to supplement the door guide brackets in guiding the door during its movement, and should the door guide brackets be accidentally torn from the car the interlocking flanges will serve to retain the bottom of the door in position against the car side and prevent it from swinging outwardly during the movement of the car. It will be further observed that my invention may be readily applied to freight cars of usual construction, and serves to efficiently protect their contents from injury through the ingress of dust and other matter between the lower edges of the sliding doors and the bottoms of the door openings.

I claim:

1. In a freight car, the combination with a vertically sliding door controlling a door opening in the car side, a Z-bar secured along the bottom of the door with one vertical flange overlying the outer surface of the door adjacent the bottom thereof and the other vertical flange depending substantially flush with the inner surface of the door, an angular weather strip having a flange overlying the inner surface of the door adjacent the bottom thereof and having a flange projecting inwardly and upwardly beneath the door opening, bolts passing through the bottom of the door and through the upwardly extending vertical flange of said Z-bar and through the flange of said weather strip which engages the inner surface of the door, a plate secured to the car floor adjacent the bottom of the door opening and having a depending flange lying between said weather strip and the upwardly projecting flange thereon, and door guide brackets secured beneath the door opening and engaging the depending flange of said Z-bar to guide the door and to prevent outward movement of the bottom thereof sufficient to injure the engaged flanges of said weather strip and plate.

2. In a freight car, the combination with a vertically arranged side sill, of a floor supported upon and projecting outwardly beyond the said side sill, a vertical sliding door controlling an opening above the car floor, a Z-bar secured along the bottom of said door and having a flange depending in a plane substantially flush with the inner surface of the door, door guide brackets secured to said side sill and extending upwardly on the outside of the depending flange of said Z-bar, a weather strip secured to the depending flange of said Z-bar and having an inwardly and upwardly projecting flange extending beneath the portion of the car floor which projects beyond said side sill, and a threshold plate having a depending flange extending between said weather strip and the upwardly projecting flange thereon, said depending flange of the threshold plate and the upwardly projecting flange of said weather strip being protected from injurious contact by the engagement of said brackets with the depending flange of said Z-bar.

3. In a freight car, the combination with a vertical sliding door controlling a door opening in the car side, of means for supporting and guiding said door in its opening and closing movements, an angular weather strip comprising a vertical flange overlying the inner surface of the bottom of the door, and a horizontal flange projecting inwardly from adjacent the lower edge of the door and extending beneath the bottom wall of the door opening, a Z-bar secured along the bottom of the door with one vertical flange overlying the outer surface of the bottom of the door and the other vertical flange depending below the door, door guide brackets secured beneath the door opening and engaging the said depending flange of the Z-bar, and bolts for securing the flanges of said weather strip and Z-bar to the opposite sides of the portion of the door which they overlap, said bolts projecting through the said flanges and through the interposed portion of the door.

4. In a freight car, the combination with a vertically arranged side sill, of a floor supported upon and projecting outwardly beyond the said side sill, a vertically sliding door controlling an opening above the car floor, a Z-bar secured along the bottom of said door with one vertical flange overlying the outer surface of the bottom of the door and the other vertical flange depending in a plane substantially flush with the inner surface of the door, an angular weather strip comprising a vertical flange overlying the inner surface of the bottom of the door and also overlying the depending flange of said Z-bar, said weather strip having an inwardly and upwardly projecting flange extending beneath the portion of the car floor which projects beyond said side sill, a threshold plate having a depending flange extending between said weather strip and the upwardly projecting flange thereon, means for securing together the overlapped flanges of said weather strip and Z-bar, means for securing the flanges of said weather strip and Z-bar to the portion of the door which they overlap, and door guide brackets secured to said side sill extending upwardly on the outside of the depending flange of said Z-bar, the relative positions of said brackets and depending flange serving to prevent injurious contact between the upwardly projecting flange on said weather strip and the depending flange on said threshold plate.

In testimony whereof, I have subscribed my name.

PERCY M. ELLIOTT.

Witnesses:
   GEO. L. WILKINSON,
   EDYTHE M. ANDERSON.